Figure 1:
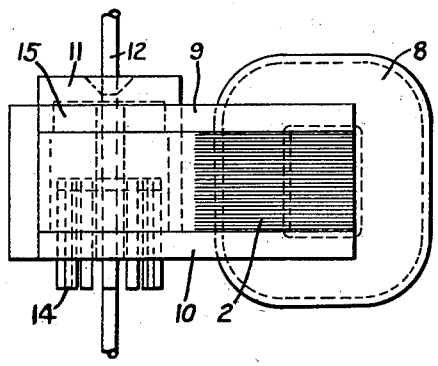

Jan. 3, 1933.  H. P. SPARKES  1,892,856

SYNCHRONOUS MOTOR

Original Filed Nov. 5, 1920

WITNESSES:
R. J. Butler.
F. H. Miller

INVENTOR
Harry P. Sparkes.
BY
Wesley G. Carr
ATTORNEY

Patented Jan. 3, 1933

1,892,856

UNITED STATES PATENT OFFICE

HARRY P. SPARKES, OF EDGEWOOD PARK, PENNSYLVANIA, ASSIGNOR TO WESTING-HOUSE ELECTRIC & MANUFACTURING COMPANY, A CORPORATION OF PENNSYLVANIA

SYNCHRONOUS MOTOR

Application filed November 5, 1920, Serial No. 421,882. Renewed December 17, 1929.

My invention relates to motors and particularly to self-starting synchronous motors.

One object of my invention is to provide a self-starting synchronous motor that may be used to indicate time.

Another object of my invention is to provide a self-starting synchronous motor having such characteristics that, when it becomes overloaded at synchronous speed, its torque is automatically increased to hold it in synchronism.

Another object of my invention is to provide a motor, of the above indicated character, that shall operate at a relatively low speed to adapt it for time-keeping purposes.

A further object of my invention is to provide a motor, of the above indicated character, that shall be inexpensive to construct and effective in its operation.

In practicing my invention, I provide a magnetizable core having split pole pieces and an energizing winding to produce a rotating field. The rotor of the motor comprises a non-magnetizable disk and a plurality of magnetizable pins disposed thereon. The shaft of the motor is adapted to be moved longitudinally, as well as to turn. The non-magnetizable armature operates, by reason of the eddy currents induced therein, as a short-circuited secondary member of an induction motor having a good starting torque and tending to accelerate the motor almost to the full synchronous speed corresponding to the two-pole stator member. The magnetizable pins, on the other hand, develop substantially no torque except at a certain sub-synchronous speed depending upon the number of pins, and the effect of such operation is to tend to draw the motor into such sub-synchronous speed and to prevent it from accelerating beyond such speed.

At starting, the induction-motor torque of the non-magnetizable disk is practically the only torque, and the disk is disposed in a position of maximum field intensity. When the critical sub-synchronous speed is reached, the magnetizable pins will be drawn into the position of maximum field intensity, and the motor will lock in step as a synchronous motor. When the magnetizable pins are within the field of maximum intensity, the non-magnetizable disk is out of the influence of the field and, therefore, does not develop a strong induction-motor torque tending to further increase the speed beyond said critical sub-synchronous speed.

However, if the load increases above the normal, the synchronous-motor torque of the magnetizable pins will approach its pull-out value. As the synchronous-motor torque of the pins thus begins to decrease, the induction-motor torque of the disk will begin again to predominate, the disk will be brought into better position within the influence of the field, and its induction-motor torque will thus be increased the better to assist the synchronous-motor torque to prevent the motor from falling back out of step.

A motor of the above designated character, by reason of its relatively low synchronous speed, is particularly adapted to indicate time, when connected to an alternating-current system, the frequency of which is constant.

Figure 2:
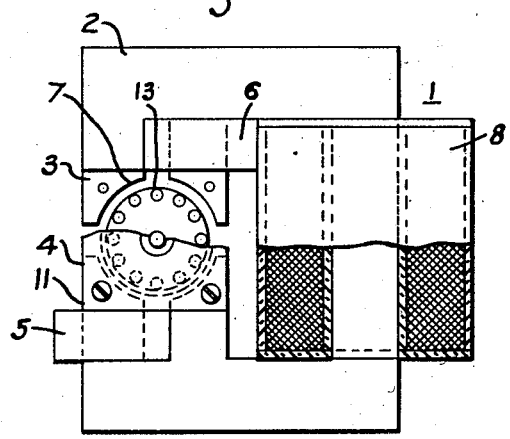

Figure 1 of the accompanying drawing is a side view of a motor embodying my invention, and Fig. 2 is a view, partially in section and partially in end elevation, of the motor shown in Fig. 1.

The motor 1, embodying my invention, comprises a magnetizable core 2 having split pole pieces 3 and 4 around portions of which are disposed closed-circuit conductors 5 and 6 to produce a rotating magnetizing field in an airgap 7 between the pole pieces.

A magnetizing winding 8 is disposed around one leg of the core 2 for the purpose of energizing the same. Non-magnetizable plates 9 and 10 are disposed adjacent the core 2 and a non-magnetizable supporting bracket 11 is disposed adjacent the airgap 7. The bracket 11 supports a shaft 12 which is rotatably and longitudinally movable therein and has mounted thereon a non-magnetizable metal disk armature 13 having a plurality of magnetizable pins 14 disposed in one face thereof.

The disk 13 is normally disposed in the position of the maximum field produced by the winding 8, and the pins 14 are normally disposed outside of the maximum field. The disk 13, being non-polar and non-magnetizable, has a relatively high starting torque, but its torque decreases with an increase in speed. The magnetizable pins 14 have relatively poor starting torque but relatively high synchronous torque. Consequently, the shaft 12 is started by reason of the disk 13 acting as the rotor of a high-torque induction motor, and the magnetizable pins 14 are then drawn into a position in which they operate in a magnetic field of maximum intensity. In other words, the shaft 12 will move longitudinally until the disk 13 occupies a position adjacent to the non-magnetizable plate 9 and the bracket 11 and is, therefore, outside of the effective field of the motor, while the pins 14, are in a field of maximum strength. In this position, the motor, by reason of the large numbers of pins, will operate in sub-synchronism with the alternating-current circuit to which the winding 8 is connected. Since the number of pins is large, the speed will be relatively low or sub-synchronous in accordance with the number of pairs of pins employed relative to the number of pairs of poles.

If the shaft 12, which is adapted to be connected to clock hands or to drive devices which should be driven at a constant speed, becomes overloaded, it will tend to drop out of step and, when this occurs, the disk 13 will be drawn into the maximum field, and the torque will increase to hold the shaft 12 in synchronism. It will be understood that the disk 13 and the pins 14 do not co-operate under normal synchronous operation but merely co-operate under starting and pull-out conditions.

It must be borne in mind that the disk 13 must, of necessity, be a non-magnetizable member in order that it may assist the pins 14 to maintain synchronism when they are overloaded and in order that a plurality of pins may be used to thus obtain a relatively low speed.

My invention is an improvement over that shown in an application by O. F. Rowe, Serial No. 557,294, filed April 29, 1922, and assigned to the Westinghouse Electric and Manufacturing Company. The claims to the common or generic subjects-matter of the two applications are in the said Rowe application.

My invention is not limited to the specific structure illustrated, as it may be variously modified without departing from the spirit and scope of the invention, as set forth in the appended claims.

I claim as my invention:—

1. A self-starting motor comprising means for producing a rotating magnetic field having a pulsating flux component, a non-magnetizable disk armature normally located in said field to be rotated thereby, with a relatively strong starting torque, and a plurality of magnetizable pins disposed on the disk armature and normally removed from the maximum influence of said field and adapted to rotate at a relatively low fixed speed relation to the field.

2. A self-starting motor comprising means for producing a rotating magnetic field having a pulsating flux component, a non-magnetizable disk armature normally located in said field to be rotated thereby with a relatively strong starting torque, said armature and field-producing means being relatively movable longitudinally, and a plurality of magnetizable pins mounted on the armature and normally removed from the maximum influence of said field but adapted to be attracted into the maximum influence of said field and to rotate in predetermined fixed relation to the field at a relatively low, or sub-synchronous, speed, the number of pins being large in comparison to the number of poles.

3. A self-starting alternating-current motor comprising means for producing a rotating magnetic field having a pulsating flux component, and an armature mounted for rotation and longitudinal displacement relative to said field-producing means, said armature comprising a non-polar secondary member normally disposed in a strong portion of the field for producing a good starting torque, and a longitudinally displaced polar member comprising a plurality of magnetic pole pieces adapted to be attracted into a strong portion of the field for causing said armature to rotate in predetermined fixed relation to the field.

4. A self-starting alternating-current motor comprising a field member having salient polar members having axially extending splits therein, means for producing a rotating magnetic field in said field member, and an armature mounted for rotation and longitudinal displacement relative to said field member, said armature comprising a non-polar secondary member normally disposed in a strong portion of the field for producing a good starting torque, and a longitudinally displaced polar member comprising a plurality of magnetic pole pieces adapted to be attracted into a strong portion of the field for causing said armature to rotate in predetermined fixed relation to the field, the magnetic pole pieces of the armature being more numerous than the salient polar members of the field member and being adapted to cooperate with the split portions of said field polar members to operate the armature at a sub-synchronous speed.

5. A self-starting alternating-current motor comprising a field member having salient polar members having axially extending splits therein, means for producing a rotating magnetic field in said field member, and a composite armature mounted for rotation and longitudinal displacement relative to said field member, said armature comprising a portion constituting an induction-motor secondary member tending to accelerate said motor almost to full synchronous speed corresponding to the number of salient polar members of said field member, and a longitudinally removed portion constituting a salient-pole synchronous-motor member having a relatively large number of salient poles adapted to lock into step with respect to the split portions of said field polar members at a definite sub-synchronous speed, said armature being normally biased to a position in which said induction-motor portion is in a strong magnetic field, and the magnetic attraction between said salient-pole portion and the field being sufficient to displace said induction-motor portion into a weaker magnetic field during running conditions.

6. In a motor, the combination with means for producing a rotating magnetic field having a pulsating flux component, of a composite armature comprising longitudinally displaced non-magnetic and magnetic elements effective, respectively, to operate the armature as an induction-motor armature and as an armature rotating in predetermined sub-synchronous relation to the field.

7. In a motor, the combination with means for producing a rotating magnetic field having a pulsating flux component, of a composite armature mounted for rotation and longitudinal movement relative to said field means and comprising a non-magnetic element effective to operate the armature as an induction-motor armature and a plurality of longitudinally removed magnetic elements effective to operate the armature in predetermined sub-synchronous relation to the field, said armature being normally biased to a position in which said non-magnetic element is in a strong magnetic field, and the magnetic attraction between said magnetic elements and the field being sufficient to displace said non-magnetic element into a weaker magnetic field during running conditions.

8. A self-starting single-phase motor comprising a bipolar field member, each pole piece thereof being split longitudinally and having a shading coil on one of the split portions, a single-phase coil for magnetizing said field member, and a composite armature comprising a portion including a non-magnetic element effective to produce torque as an induction-motor armature and a longitudinally displaced portion including a plurality of magnetic elements effective to lock into step with respect to the split portions of said field pole pieces at a definite sub-synchronous speed.

9. A self-starting single-phase motor comprising a bipolar field member, each pole piece thereof being split longitudinally and having a shading coil on one of the split portions, a single-phase coil for magnetizing said field member, and an armature mounted for rotation and longitudinal displacement relative to said field member, said armature comprising means constituting an induction-motor secondary member tending to accelerate said motor almost to full bipolar synchronous speed, and a longitudinally displaced means constituting a salient pole synchronous-motor member having a relatively large number of salient poles adapted to lock into step with respect to the split portions of said field pole pieces at a definite sub-synchronous speed, said armature being normally biased to a position in which said induction-motor member is in a strong magnetic field, and the magnetic attraction between said salient-pole member and the field being sufficient to displace said induction-motor member into a weaker magnetic field during running conditions.

10. A self-starting single-phase motor comprising a bipolar field member, each pole piece thereof being split longitudinally and having a shading coil on one of the split portions, a single-phase coil for magnetizing said field member, an armature mounted for rotation relative to said field member, said armature comprising means constituting an induction-motor secondary member tending to accelerate said motor almost to full bipolar synchronous speed, and longitudinally displaced means constituting a salient-pole synchronous-motor member having a relatively large number of salient poles adapted to lock into step with respect to the split portions of said field pole pieces at a definite sub-synchronous speed, and means for automatically strengthening the synchronizing effect of the salient-pole armature means at the expense of the induction-motor armature means when the pull-in torque of the salient-pole armature means begins to become effective.

11. A self-starting single-phase motor comprising a bipolar field member, each pole piece thereof being split longitudinally and having a shading coil on one of the split portions, a single-phase coil for magnetizing said field member, an armature mounted for rotation relative to said field member, said armature comprising means constituting an induction-motor secondary member tending to accelerate said motor almost to full bipolar synchronous speed, and longitudinally displaced means constituting a salient-pole synchronous-motor member having a relatively large number of salient poles adapted to lock into step with respect to the split portions of said field pole pieces at a definite sub-synchronous speed, and means for automatically strengthening the torque produced by the induction-motor armature means at the expense of the synchronizing effect of the salient-pole armature means when the load increases to a point approaching the pull-out value.

12. An induction motor operable at a fixed synchronized speed characterized by having a rotor structure comprising a non-magnetic secondary member and a pin-type reaction member having a plurailty of pairs of magnetizable pins.

In testimony whereof, I have hereunto subscribed my name this 22nd day of October 1920.

HARRY P. SPARKES.